G. W. HART.
MECHANICAL MOVEMENT.
APPLICATION FILED OCT. 15, 1908.

939,193.

Patented Nov. 2, 1909.

Witnesses:
Inventor
GERALD W. HART

UNITED STATES PATENT OFFICE.

GERALD W. HART, OF WEST HARTFORD, CONNECTICUT, ASSIGNOR TO THE HART MANUFACTURING COMPANY, OF HARTFORD, CONNECTICUT, A CORPORATION OF NEW JERSEY.

MECHANICAL MOVEMENT.

939,193.  Specification of Letters Patent.  Patented Nov. 2, 1909.

Application filed October 15, 1908. Serial No. 457,825.

*To all whom it may concern:*

Be it known that I, GERALD W. HART, a citizen of the United States, residing at West Hartford, Hartford county, Connecticut, have invented certain new and useful Improvements in Mechanical Movements, of which the following is a full, clear, and exact description.

My invention relates to mechanical movements and has for its object to provide a simple combination of elements by which motion in one plane can be converted into rotary motion in another plane. In the preferred form of my invention both motions are rotary and are about axes at right angles to one another.

By my combination I avoid cumbersome gears and bearings which have heretofore been necessary to obtain rotary motion in one plane from rotary motion in another plane, and am enabled to secure the result with parts which take up small space but are still of very considerable strength.

My invention is applicable wherever it is desired to convert a movement in one plane into a rotary movement in another plane, such for instance as in electric switches, washing machines and similar devices.

The following is a description of an embodiment of my invention, reference being had to the accompanying drawings, in which,—

Figure 1:
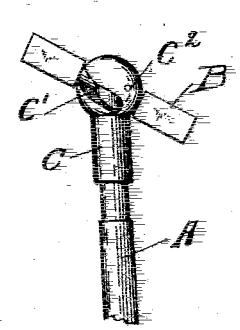
Figure 3:
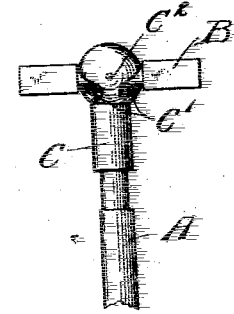
Figure 2:
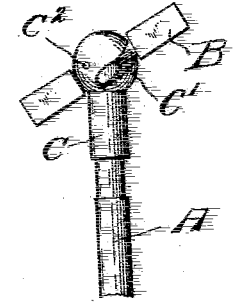
Figure 4:
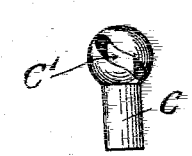
Figure 5:
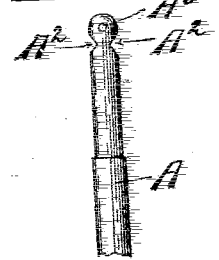
Figure 7:
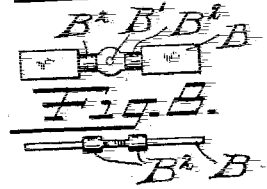
Figure 8:
Figure 6:
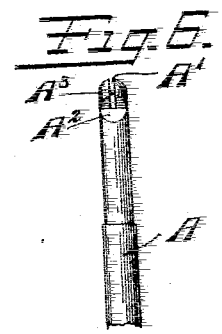

Figure 1 represents a front elevation of a device embodying the invention with the parts in one position. Fig. 2 is a front elevation of the device with the parts in a different position. Fig. 3 shows the parts in an intermediate position. Fig. 4 is a side view of one member. Figs. 5 and 6 are front and side elevations of a second member. Figs. 7 and 8 are a side elevation and plan view of a third member.

Referring more particularly to the drawings, A is an upright having its upper end slotted at A' and slightly undercut at A². B is a second member pivoted to the first member by a pin A³ passing through the hole B' so as to oscillate in a single plane relative to the first member, the slot in the first member confining the second member so that the relative movement of the two parts is always in a single plane. C is a third member which has oblique slots C' therein, through which the second member B passes. This third member C surrounds the first member A and is mounted thereon so as to be freely revoluble about it. In the form shown, which is the preferred form, the oblique slots are slightly spiral, one being a right-hand spiral, while the other is a left-hand spiral. The third member has an opening C² through which the pivot pin A³ is inserted so as to pass through the first two members. The pin A³ when in place is entirely within the parts A and B. (See Fig. 6.)

The operation of the device is as follows: If the first member is held stationary and either end of the second member is moved up and down, the third member, by reason of the engagement of the second member therewith, is caused to revolve through a portion of an arc. If the third member is held stationary and the second member is moved up and down, it, together with the first member, is caused to revolve through a portion of an arc. If the first member is held stationary and the third member is revolved through a portion of an arc, the second member is caused to move up and down. When the second member is pivoted to the first, the third member is preferably provided with a substantially spherical exterior surface so that a point on the second member coinciding with the surface of the third member will coincide with such surface, whatever may be the position of the second member. The first member is undercut so as to permit the second member, when pivoted, to have a maximum movement. I preferably make the slots C' somewhat spiral so that the incline, at the start of a member passing through the slots, is slightly steeper than at the intermediate portion of its movement.

The member B is reduced at its central portion B' where it lies within the slot, the reduced portion being shown in Fig. 8. It is preferably rounded at the portions B² B² where it engages the sides of the slots C' in the member C.

This mechanical movement is adapted for use in various relations where it is desirable to convert movement in one plane into movement in another plane. It has the advantage of great simplicity and also the advantage of great strength, the parts being relatively massive though actually small in size.

The invention is capable of embodiment in various forms, but the form shown is the preferred form.

What I claim is:

1. In combination, two members, one mounted in the other so that the two members have a relative movement in a single plane, a third member mounted on and surrounding one of said members and revoluble about the same, and having a substantially oblique slot through which the other of said two members projects the axis of rotation of the revoluble member coinciding with the axis of one of said two members and intersecting the axis of the other of said two members at the point where it is mounted.

2. In combination, two members, one mounted in the other so that the two members have a relative movement in a single plane, a third member mounted on and surrounding one of said members and revoluble about the same, and having substantially oblique slots through which the other of said two members projects, said two members being pivoted one to another.

3. In combination, two members, one mounted in the other so that the two members have a relative movement in a single plane, a third member mounted on and surrounding one of said members and revoluble about the same, and having substantially oblique slots through which the other of said members projects, said two members being pivoted one to another, the pivot axis being in a plane at right angles to the axis of said third member.

4. In combination, two members, one mounted in the other so that the two members have a relative movement in a single plane, a third member mounted on and surrounding one of said members and revoluble about the same, and having substantially spiral slots through which the other of said two members projects, said two members being pivoted one to another.

5. In combination, two members, one mounted in the other so that the two members have a relative movement in a single plane, a third member mounted on and surrounding one of said members and revoluble about the same, and having substantially oblique slots through which the other of said two members projects, said two members being pivoted one to another, the portion containing said slots having a substantially spherical exterior surface.

GERALD W. HART.

Witnesses:
EDWARD TAYLOR,
J. T. CLARKE.